United States Patent Office 3,772,395
Patented Nov. 13, 1973

3,772,395
PROCESS FOR INCREASING SELECTIVITY OF TETRAMETHYLENE GLYCOL
Mitsuo Yamaguchi and Yoichi Kageyama, Tokyo, Japan, assignors to Mitsubishi Chemical Industries, Ltd., Tokyo, Japan
No Drawing. Filed Aug. 26, 1971, Ser. No. 175,359
Claims priority, application Japan, Aug. 6, 1970, 45/77,667
Int. Cl. C07c 31/18
U.S. Cl. 260—635 D                       5 Claims

ABSTRACT OF THE DISCLOSURE

The selectivity of tetramethylene glycol, by the hydrogenation of γ-butyrolactone, is increased by using a catalytically active metallic nickel-metallic cobalt-oxide of thorium.

BACKGROUND OF THE INVENTION

Field of the invention

This invention relates to a process for increasing the selectivity of tetramethylene glycol (hereinafter referred to as TMG). More particularly, this invention relates to a process for increasing the selectivity of TMG in the hydrogenation of γ-butyrolactone (hereinafter referred to as γ-BL) by using a novel nickel type catalyst.

Description of the prior art

It is known to form TMG by the hydrogenation of the corresponding γ-BL, in the presence of a catalyst. This reaction has not, however, been conducted satisfactorily on an industrial scale.

The conventional catalysts used in that reaction are usually characterized by relatively low reaction activities. Although certain catalysts are known which have a higher activity, it has been found that they rapidly lose their high activity within short operating periods.

Another difficulty with the hydrogenation technique for the production of TMG, is that large quantities of tetrahydrofuran (hereinafter referred to as THF) and by-products butyl alcohol and propyl alcohol, are also produced.

A need exists, therefore, for a high activity catalyst which does not lose its high activity in a short period of time. A need also exists for a catalyst which will improve the selectivity of the hydrogenation reaction to increased production of TMG.

SUMMARY OF THE INVENTION

Accordingly, it is one object of this invention to provide a process for hydrogenating γ-BL to form TMG whereby the selectivity for the formation of TMG is high, and which process can be used advantageously on an industrial scale.

It is another object of this invention to provide a high activity catalyst, which remains highly active over a relatively extended period of time.

These and other objects have now herein been attained by hydrogenating γ-butyrolactone in contact with a catalyst containing metallic nickel, metallic cobalt, and oxide of thorium.

DETAILED DESCRIPTION OF THE EMBODIMENTS

The catalyst used for this invention contains three catalytically active components, metallic nickel, metallic cobalt and oxide of thorium. The term "oxide of thorium" is meant to include not only thorium oxide, but also other oxides of thorium as well. The ratio of the three components may be 1:0.02–10:0.04–10 by weight of Ni:Co:ThO$_2$ and preferably, 1:0.1–0.1–6 of Ni:Co: ThO$_2$. Although oxides of thorium have been used in catalytic compositions previously, they are ordinarily only used as carriers. In contradistinction, the oxides of thorium in the present invention provide certain synergistic effects when combined with metallic nickel and cobalt, and hence they provide the dual function of both carrier and catalytically active component. This difference is a significant characteristic of this invention.

The starting materials for preparation of the catalytically active composition of this invention is not critical. Preferably, preparation of the composition can begin with a variety of nickel compounds, cobalt compounds and thorium compounds which are easily converted into metallic nickel, metallic cobalt and oxides of thorium by heat, in various operations involving drying, oxidizing or reducing. For example, suitable for the preparation of the catalyst are inorganic salts, e.g., nitrate, chloride, and organic salts, e.g., formate, acetate or hydroxide of nickel, cobalt or thorium.

The catalytically active components can be used without any additional carrier. However, the components are preferably supported on a carrier. When a carrier is used, it is suitable to use high siliceous content materials, such as silica, silica-alumina, kieselguhr and pumice. Best results are obtainable by using a carrier having an SiO$_2$ content of more than 80%. The reason for the good results with SiO$_2$ as the carrier is not clear. However, it is believed that the SiO$_2$ affects the catalytic mechanism of the Ni-Co-ThO$_2$ composition. The amount of catalytically active components carried on the carrier may be from 1:0.1–50, and preferably 1:1–10 by weight of metallic nickel:carrier. The technique for supporting the catalytic composition on the carrier is not critical and any conventional technique may be used to achieve this result. For instance, support can be obtained by conventional impregnation, atomization, precipitation, coprecipitation, etc. Impregnation, however, is relatively simple and results in a catalyst system which provides highly reproduceable reaction results.

In preparing the catalyst by coprecipitation, a mixture of kieselguhr in an aqueous solution of nickel nitrate, cobalt nitrate and thorium nitrate is prepared and an ammonia solution is added dropwise to said mixture while stirring.

In preparing the catalyst by precipitation, nickel, cobalt and thorium hydroxide are precipitated onto the surface of kieselguhr. The resulting product is washed with water, dried and reduced with hydrogen to prepare a catalyst containing kieselguhr as the carrier and metallic nickel, cobalt and an oxide of thorium as the catalytically active components.

Interestingly, when thorium hydroxide or thorium nitrate are reduced with hydrogen, the result is thorium oxide and not metallic thorium.

In preparing the catalyst by impregnation, kieselguhr is impregnated with an aqueous solution of nickel nitrate and cobalt nitrate and thorium nitrate, and then is dried and calcined in air.

In the present catalytic composition, nickel is the principal catalytically active component for the hydrogen reduction reaction. Cobalt is a promoter for improving the reduction activity and the oxide of thorium functions to synergistically improve the reaction-selectivity to TMG and to promote the catalytic activity of the composition at high temperatures for extended periods of time.

In conducting the reaction using the catalyst of this invention, it is desirable to effect the reaction between certain defined limits. When the reaction temperature is too high, the reaction is too severe and various decomposition products may be produced, thereby adversely affecting the yield. Accordingly, it is desirable to effect the reaction between 150° and 400° C., and preferably 200°–300° C., at a pressure of 50–600 atmospheres, and preferably 100–500 atmospheres of hydrogen pressure.

The recation time has a close relationship with temperature and pressure, etc., and should be controlled depending upon the selected conditions of temperature and pressure, and is usually 1–15 hours.

A solvent may be used during hydrogenation to improve the uniformity and ease of reaction by removing the exothermic heat of reaction. Suitable solvents which may be used for this purpose are those which are stable under the reaction conditions and include dioxane, acetone, tetrahydrofuran, methanol, ethanol, etc. The amount of solvent used can be discretionally selected, but is preferably 0.1–10 times the amount by weight to the resulting product.

The reaction can be carried out either in batch operations or continuously. The reaction can also be conducted in a plurality of steps. Suitable catalyst mediums for the reaction include fixed-bed systems, moving-bed systems, fluidized-bed systems, etc.

As stated above, when $\gamma$-BL is hydrogenated in accordance with this invention, the catalyst maintains high activity for a relatively long time and TMG can be effectively produced on an industrially acceptable scale. These advantages can be shown by comparison with the same process using conventional catalysts.

Having generally described the invention, a more complete understanding can be obtained by reference to certain specific examples, which are included herein for purposes of illustration only and are not intended to be limiting unless otherwise specified.

EXAMPLE 1

Nickel nitrate, cobalt nitrate and thorium nitrate in a ratio of 5:20:10 parts by weight as metal nickel:metallic cobalt:thorium oxide, were dissolved in 10 parts by weight of water at 80° C. 65 parts by weight of kieselguhr was immersed in the solution, and was dried at 80–100° C. for 10 hours. The product was then calcined at 350° C. for 4 hours in air to cause decomposition, and was reduced at 400° C. for 8 hours in an atmosphere of hydrogen gas. The resulting catalyst consisted of a carrier of kieselguhr and a catalytically active NiCo-ThO$_2$ (5-20-10 by weight). The ratio of the catalytically active components to the carrier was 35:65 by weight.

50 cc. of $\gamma$-BL and 20 g. of said Ni-Co-ThO$_2$/kieselguhr catalyst were charged into a shaking type autoclave having a volume of 200 cc. and then hydrogen was supplied under pressure. The reaction was conducted at a reaction temperature of 250° C. under 100 atm. total pressure, for 6 hours. The resulting product was cooled and was analyzed by gas-chromatography. As a result, it was found that 58.1 g. of TMG and 0.7 g. of tetrahydrofuran and a small amount of decomposition products of propanol, butanol, etc. were produced. The yield of TMG and THF were, respectively, 98.0 mole percent and 8.7 mole percent. It was found that the activity of catalyst of this example was not decreased for more than 2,000 hours by the life test in the fixed-bed continous reaction process.

EXAMPLES 2–6

The process for producing TMG of Example 1 was repeated, except changing the catalyst and reaction conditions. The results are shown in Table 1, together with the results of Example 1.

The yields of TMG and the by-product were respectively calculated by the following formula:

$$\text{Yield of TMG} = \frac{\text{mole of TMG}}{\text{mole of starting material of } \gamma\text{-BL}} \times 100 \text{ (percent)}$$

Yield of by-product $$= \frac{\left(\begin{array}{c}\text{total of each carbon}\\ \text{atom of by-products}\end{array}\right) \times \left(\begin{array}{c}\text{mole of}\\ \text{by-product}\end{array}\right)}{\left(\begin{array}{c}\text{carbon atoms of starting}\\ \text{material } \gamma\text{-BL}\end{array}\right) \times \text{mole of } \gamma\text{-BL}} \times 100 \text{ (percent)}$$

TABLE 1

| | Catalyst | | Condition of reaction | | | | Yield | | | | Selectivity TMG (percent) | Autoclave charging |
|---|---|---|---|---|---|---|---|---|---|---|---|---|
| Ex. | Composition Ni-Co-ThO$_2$ | Carrier Car:Cat | Temp., ° C. | Pressure atmospheric | Time, hrs. | Solvent | TMG (percent) | THF (percent) | By-product (percent) | Unreacted $\gamma$-BL (percent) | | |
| 1 | 5:20:10 | [1] 65:35 | 250 | 100 | 4 | None | 98 | 1.5 | 0.5 | [4] | 98 | $\gamma$-BL 50 cc. charge Cat. 20 g. charge. |
| 2 | 10:10:5 | [1] 75:25 | 210 | 500 | 4 | Dioxane | 85 | 4 | 2 | 9 | 93.4 | Solvent 50 cc. $\gamma$-BL 50° C. Cat. 20 g. |
| 3 | 5:25:20 | [2] 50:50 | 280 | 150 | 2 | None | 71 | 5 | 1 | 23 | 92.2 | $\gamma$-BL 50 cc. Cat. 20 g. |
| 4 | 30:5:5 | [1] 60:40 | 270 | 400 | 3 | Methanol | 89 | 6 | 2 | 3 | 91.8 | Solvent 50 cc. $\gamma$-BL 50 cc. Cat. 20 g. |
| 5 | 20:20:10 | [3] 50:50 | 250 | 300 | 1 | None | 50 | 1 | 1 | 48 | 96.1 | Cat. 20 g. $\gamma$-BL 50 cc. |
| 6 | 10:5:5 | [1] 80:20 | 200 | 200 | 10 | Hexane | 69 | 1 | 0.5 | 30 | 98.6 | Solvent 50 cc. $\gamma$-BL 50 cc. Cat. 20 g. |

[1] Kieselguhr carrier.
[2] Silica carrier.
[3] Silica-alumina carrier (silica:alumina=85:15).
[4] Unreacted $\gamma$-BL was less than 0.5%.

EXAMPLE 7

The catalyst of active components of Ni-Co-ThO$_2$ having the ratio of 10:10:5 by weight of Ni:Co:ThO$_2$ and carrier of 75% by weight of kieselguhr was packed in a reactor. $\gamma$-BL was continuously supplied together with hydrogen at an average temperature of 230° C. in a packed layer, under a pressure of 300 atm.

The results are as follows:

| | Conversion of $\gamma$-BL | Selectivity of TMG |
|---|---|---|
| After 10 hours, percent | 89 | 92 |
| After 200 hours, percent | 86 | 93 |
| After 400 hours, percent | 86 | 92 |

COMPARATIVE EXAMPLE

A catalyst was prepared according to Example 1 except the oxide of thorium was replaced with titanium oxide. The process for hydrogenating $\gamma$-BL of Example 1 was repeated, except using said catalyst. The results were as follows:

| | |
|---|---|
| Catalyst—Ni-Co-TiO$_2$ | 5:20:10 |
| Carrier—kieselguhr | 65 |
| Temp. | 250 |
| Pressure | 200 |
| Time | 3 |
| Yield: | |
|    TMG | 3 |
|    THF | 30 |
|    unreacted γ-BL | 67 |

It is clear that the yield of TMG was quite low and the selectivity of TMG was quite low.

Having now fully described the invention, it will be apparent to one of ordinary skill in the art that many changes and modifications can be made thereto without departing from the spirit or scope of the invention.

Accordingly, what is claimed as new and intended to be secured by Letters Patent of the United States is:

1. A process for producing tetramethylene glycol which comprises hydrogenating γ-butyrolactone in the presence of a catalyst consisting essentially of metallic nickel, metallic cobalt, and an oxide of thorium as the catalytically active components wherein the ratio of metallic nickel, metallic cobalt and oxide of thorium is 1:0.02–10:0.04–10 by weight, and wherein the reaction is conducted at a temperature of 150°–400° C. and under a hydrogen pressure of 50–600 atmospheres.

2. The process of claim 1, wherein the catalytically active components are supported on a carrier.

3. The process of claim 2, wherein the ratio of metallic nickel:carrier is 1:01–50 by weight.

4. The process of claim 2, wherein the carrier is a highly siliceous material containing more than 80% of SiO$_2$.

5. The process of claim 4, wherein the reaction is conducted in the presence of a solvent.

References Cited

UNITED STATES PATENTS

| | | | |
|---|---|---|---|
| 3,370,067 | 2/1968 | Johnson | 260—346.1 |
| 2,244,196 | 6/1941 | Herbert | 252—472 |

FOREIGN PATENTS

| | | | |
|---|---|---|---|
| 870,245 | 3/1953 | Germany | 252—472 |

OTHER REFERENCES

Moritz et al., Chem. Abst. 71, 12536h, 1969, Japan, 69 05 366.

HOWARD T. MARS, Primary Examiner

U.S. Cl. X.R.

260—346.1